US008543256B1

(12) United States Patent
Karafiath (10) Patent No.: US 8,543,256 B1
(45) Date of Patent: Sep. 24, 2013

(54) TRANSFORMABLE TELEOPERATED AMPHIBIOUS FUEL TRUCK

(75) Inventor: Gabor Karafiath, Silver Spring, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 235 days.

(21) Appl. No.: 13/157,754

(22) Filed: Jun. 10, 2011

(51) Int. Cl.
*B60F 3/00* (2006.01)

(52) U.S. Cl.
USPC ............ 701/2; 701/21; 440/12.51; 114/61.1; 114/344

(58) Field of Classification Search
USPC .............. 701/2, 21; 440/12.5–12.7; 114/38, 114/321, 330–333, 344, 61.1–61.13
See application file for complete search history.

(56) References Cited

U.S. PATENT DOCUMENTS

| | | | |
|---|---|---|---|
| 613,809 A | | 11/1898 | Nikola Tesla |
| 3,154,044 A | * | 10/1964 | Bellas ........................ 114/344 |
| 3,395,665 A | * | 8/1968 | Rosenberg et al. ........... 114/51 |
| 3,424,119 A | * | 1/1969 | Roche et al. ................. 114/38 |
| 3,602,182 A | * | 8/1971 | Cady et al. .................. 114/198 |
| 3,604,386 A | * | 9/1971 | Turci ........................... 114/125 |
| 3,698,339 A | * | 10/1972 | Golay et al. ................. 114/321 |
| 4,007,700 A | * | 2/1977 | Haynes et al. .............. 114/74 T |
| 4,409,917 A | * | 10/1983 | Kramer Da Luz ............ 114/38 |
| 4,727,949 A | * | 3/1988 | Rea et al. .................... 180/9.32 |
| 4,854,257 A | | 8/1989 | Grayson |
| 4,919,067 A | * | 4/1990 | Wenstob et al. ............ 114/345 |
| 5,211,127 A | * | 5/1993 | Sprunger ..................... 114/344 |
| 5,215,025 A | * | 6/1993 | Talmor ........................ 114/271 |
| 5,280,761 A | | 1/1994 | Karafiath et al. |
| 5,733,158 A | | 3/1998 | Higginbotham et al. |
| 6,038,995 A | | 3/2000 | Karafiath et al. |
| 6,375,529 B1 | | 4/2002 | Infante et al. |
| 6,390,733 B1 | * | 5/2002 | Burbage et al. ............. 405/203 |

(Continued)

FOREIGN PATENT DOCUMENTS

| | | | |
|---|---|---|---|
| CH | 666659 A5 | * | 8/1988 |
| JP | 59167397 A | * | 9/1984 |
| SU | 1011399 A | * | 4/1983 |
| SU | 1229132 A | * | 5/1986 |

OTHER PUBLICATIONS

Translation of JP 59-167397 A (original JP document published Sep. 20, 1984).*

(Continued)

*Primary Examiner* — James Trammell
*Assistant Examiner* — David Testardi
(74) *Attorney, Agent, or Firm* — Howard Kaiser (57) ABSTRACT

According to typical practice of the present invention, a vehicle is remotely controlled and is travelable both in water and on land. The vehicle has two liquid-containment components that are situated generally one above the other. Pumping devices bring about transfer of cargo liquid (e.g., fuel or water) from either component to the other component. In accordance with the liquid transfer, the vehicle turns over, about its longitudinal axis, between two generally opposite buoyant positions, each of which is stable and viable for marine navigation. When the flow of the liquid sufficiently shifts weight from one component to the other, the vehicle inverts; that is, the emptying component flips from the bottom to the top, and the filling component flips from the top to the bottom. One of the buoyant positions of the vehicle is characterized by wheels for amphibiously transitioning the vehicle from water travel to land travel.

12 Claims, 11 Drawing Sheets

(56) References Cited

U.S. PATENT DOCUMENTS

| | | | |
|---|---|---|---|
| 6,582,264 | B2 | 6/2003 | Brown |
| 6,601,529 | B1 | 8/2003 | Karafiath |
| 6,932,020 | B2 | 8/2005 | Everett |
| 7,281,484 | B1 * | 10/2007 | Alvarez-Calderon ........ 114/312 |
| 7,856,938 | B2 | 12/2010 | Marion et al. |
| 8,069,806 | B1 | 12/2011 | Karafiath |
| 8,382,541 | B1 | 2/2013 | Campbell |
| 2012/0318184 | A1 * | 12/2012 | Morrison ....................... 114/125 |
| 2013/0078876 | A1 * | 3/2013 | Page et al. ......................... 440/6 |
| 2013/0125804 | A1 | 5/2013 | Copenhaver |

OTHER PUBLICATIONS

Nuttall, C.J., et al., "High speed wheeled amphibians—a concept study", Davidson Laboratory Report R-726-1, Stephens Institute of Technology, Aug. 1969, 167 pages, downloaded from http://www.dtic.mil/dtic/tr/fulltext/u2/694057.pdf.*

Gabor Karafiath, "Transformable Teleoperated Amphibious Fuel Truck (TTAFT)," presented at the Multi-Agency Craft Conference (MACC), Jun. 14-16, 2011, Joint Expeditionary Base, Little Creek—Fort Story, Norfolk, VA (21 pages).

"LARC-V," Wikipedia, the free encyclopedia, http://en.wikipedia.org/w/index.php?title=LARC-V&printable=yes, 3 pages, accessed online on May 23, 2011.

"LARC-V," Wikipedia, the free encyclopedia, http://en.wikipedia.org/w/index.php?title=LARC-V&printable=yes, 3 pages, accessed online on Jun. 11, 2013.

Bruce Buls, "The MACC Whacky," Buls Eye, WorkBoat.com, http://www.workboat.com/blogpost.aspx?id=10283&blogid=4294987729, 2 pages, accessed online on Jun. 11, 2013.

* cited by examiner

TRANSFORMABLE TELEOPERATED AMPHIBIOUS FUEL TRUCK

BACKGROUND OF THE INVENTION

The present invention relates to marine vessels, more particularly to amphibious marine vessels that are suitable for performing auxiliary functions (e.g., transporting personnel and cargo between locations) in military operations or humanitarian relief operations.

For many years the United States Armed Forces have implemented various amphibious vessels for auxiliary purposes such as transporting cargo. For instance, a series of "LARC" (Lighter, Amphibious, Resupply, Craft) vessels has been used, commencing with the introduction in the late 1950's of the LARC 5, an aluminium-hulled wheeled amphibious cargo vehicle capable of transporting five tons. The LARC 5 is sufficiently mobile to traverse sand, coral beaches, unimproved roads, and off-road terrain, and to maneuver through a surf of 10-foot breakers. More recent LARC models have included the LARC 15 (which has a fifteen-ton payload capacity) and the LARC 60 (which has a sixty-ton payload capacity).

Generally speaking, the various LARC designs share the following characteristics: non-retractable wheels; low water speed; manned; rugged but high-maintenance. A LARC vessel includes wheels that are not retracted when the LARC vessel is in water; in fact, the LARC 60 has no suspension. LARC vehicles have traditionally been manned by at least a driver, usually assisted by a second crewman. LARCs generally are very rugged craft, exceeded their design service life, but are maintenance-intensive.

Most current marine systems for supplying fuel implement either a flexible fuel line or a fuel-carrying marine vehicle. A flexible fuel line extends from ship to shore. A fuel-carrying vehicle, such as a lighter, an LCAC, or a wheeled amphibious vehicle (e.g., LARC 5, 15, or 60), carries fuel trucks to the beach. When a flexible fuel line is used, it is necessary that the ship be fairly close to shore, and that the inland end of the pipe be close to the beach. Although a flexible fuel line arrangement affords a fuel capacity transfer rate that cannot be matched by any reasonable number of fuel-carrying vehicles, it is also vulnerable to enemy action because of its fixed and extensive nature. Fuel-supply systems involving parachutes have also been known, but parachutes drop very small quantities of fuel. All of the current fuel-supply systems are manpower-intensive, have limited at-sea range or sea-state capability, and require a separate fuel truck.

Because a pipe or hose such as a fuel line is such an easy target, the better fuel-supply approach in general is to deliver fuel in a mobile manner. Fuel is not the only liquid that requires transport, as bulk liquid distribution of fresh water to a water-scarce area is also of great import. A water-supply system should preserve water quality and taste. In addition, a fuel-supply system or water-supply system should reduce enemy risks to personnel, especially so as to minimize casualties due to enemy weaponry such as IEDs (improvised explosive devices). Accordingly, the need exists for a totally mobile system for supplying fuel and/or fresh water directly from a sea base to a secure forward area. The fuel/water supply system should be capable of at-sea transit from a sea base that is far offshore.

In general, a seagoing vessel is characterized by motion describable in terms of six degrees of freedom, viz., heave, surge, sway, roll, pitch, and yaw. The three kinds of translational ship motion are commonly referred to as heave (linear movement along a vertical axis), surge (linear movement along a horizontal fore-and-aft axis), and sway (linear movement along a horizontal port-and-starboard axis). The three kinds of rotational ship motion are commonly referred to as roll (rotational movement about a horizontal fore-and-aft axis), pitch (rotational movement about a horizontal port-and-starboard axis), and yaw (rotational movement about a vertical axis).

Use of radio frequency waves to remotely control devices such as vehicles has been known since the time of Nikola Tesla and his U.S. Pat. No. 613,809, issued 8 Nov. 1898, entitled "Method of and Apparatus for Controlling Mechanism of Moving Vessels or Vehicles," incorporated herein by reference. The term "teleoperation," in common usage, refers to human operation of a machine at a distance, is synonymous with the term "remote control," and is frequently seen in robotic applications, for instance involving microsurgery or real-time control of remotely located mobile devices for exploration or mining.

Many vehicular land, sea, and air systems have demonstrated the efficacy of remote control of unmanned vehicles. Unmanned vehicles of interest include the USV (unmanned surface vehicle) and the RPV (remotely piloted vehicle). An example of RPV technology is the "Scan Eagle," a UAV (unmanned aerial vehicle) that has a 3.2-meter wingspan, operates on JP5, and can stay aloft for a day. Use of the Scan Eagle has been demonstrated for launch and recovery via an integrated pneumatic launcher and a fifty-foot vertical recovery rope at sea, and as a fast unmanned riverine patrol boat providing a data link (including a bird's eye view) to the remote operator.

SUMMARY OF THE INVENTION

In view of the foregoing, it is an object of the present invention to provide an improved methodology for transporting liquid supplies between geographically distant locations that are separated in part by water and in part by land.

According to typical embodiments of the present invention, a marine vessel is bi-directionally invertible and bi-orientationally operable. The inventive vessel can be operated (e.g., maneuvered and powered) in water in both opposite upright orientations between which the vessel can be inverted, and can be provided with wheels on one or both vertically opposite sides of the vessel for operation on land in one or both upright orientations. The inventive vessel is "self-inverting" in the sense that inversion in either direction (upside-to-downside or downside-to-upside) is inventively controlled.

The inventive vessel, as typically embodied, includes a hull, two chambers, and two pumping mechanisms. The hull is characterized by approximately a geometric longitudinal axis and is divided into two hull sections (a first hull section and a second hull section) by approximately a geometric horizontal plane. The hull is capable of turning about its longitudinal axis so as to invert either from a first waterborne condition to a second waterborne condition, or from the second waterborne condition to the first waterborne condition. According to the first waterborne condition, the first hull section is at least substantially above water and the second hull section is at least substantially below water. According to the second waterborne condition, the second hull section is at least substantially above water and the first hull section is at least substantially below water.

The chambers are a first chamber and a second chamber. The first chamber is encompassed by the first hull section. The second chamber is encompassed by the second hull section. The two pumping mechanisms are a first pumping mechanism and a second pumping mechanism. The first pumping mechanism pumps liquid from the first chamber to the second chamber. The second pumping mechanism pumps liquid from the second chamber to the first chamber. The first waterborne condition results from pumping of liquid via the first pumping mechanism from the first chamber to the second chamber. The second waterborne condition results from pumping of liquid via the second pumping mechanism from the second chamber to the first chamber.

According to typical inventive practice, the inventive marine vessel further includes at least three wheels and a teleoperational system. The wheels are associated with the first hull section. The teleoperational system remotely controls (i) speed and direction of the hull in the first waterborne condition, the second waterborne condition, and the land borne condition; and, (ii) inversion of the hull from the second waterborne condition to said first waterborne condition, and from the first waterborne condition to the second waterborne condition.

The hull inverts from the second waterborne condition to the first waterborne condition when the proportion of liquid between the first chamber and the second chamber is sufficiently shifted in favor of the second chamber that a moment of force associated with the mass of the liquid causes the hull to turn over from the second waterborne condition to the first waterborne condition. The hull inverts from the first waterborne condition to the second waterborne condition when the proportion of liquid between the first chamber and the second chamber is sufficiently shifted in favor of the first chamber that a moment of force associated with the liquid causes the hull to turn over from the first waterborne condition to the second waterborne condition.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 1 and FIG. 2 depict an embodiment of a land-sea transport vehicle in accordance with the present invention. FIG. 1 and FIG. 2 are complementary schematics illustrative of an embodiment of a transport system in accordance with the present invention. FIG. 1 includes FIG. 1A, FIG. 1B, FIG. 1C, and FIG. 1D. FIG. 2 includes FIG. 2A, FIG. 2B, FIG. 2C, and FIG. 2D. FIG. 1A, FIG. 1C, FIG. 1D, FIG. 2A, FIG. 2B, and FIG. 2D are perspective views. FIG. 1B and FIG. 2C are elevation views. In FIG. 1 and FIG. 2, arrows indicate sequences of events. FIG. 1 shows transitioning of an embodiment of an inventive vehicle from water-travel mode to land-travel mode. FIG. 2 shows transitioning of the inventive vehicle from land-travel mode to water-travel mode. FIG. 1 through FIG. 9 show essentially the same embodiment of an inventive vehicle.

FIG. 4 is particularly illustrative of the emptiness of the "wheel-side" compartment (upper compartment, as shown), and of containment of cargo liquid in the "smooth-side" compartment (lower compartment, as shown).

FIG. 5 is particularly illustrative of the emptiness of the "smooth-side" compartment (upper compartment, as shown), and of containment of cargo liquid in the "tire-side" compartment (lower compartment, as shown).

DESCRIPTION OF EXEMPLARY EMBODIMENTS OF THE INVENTION

Figure 4:
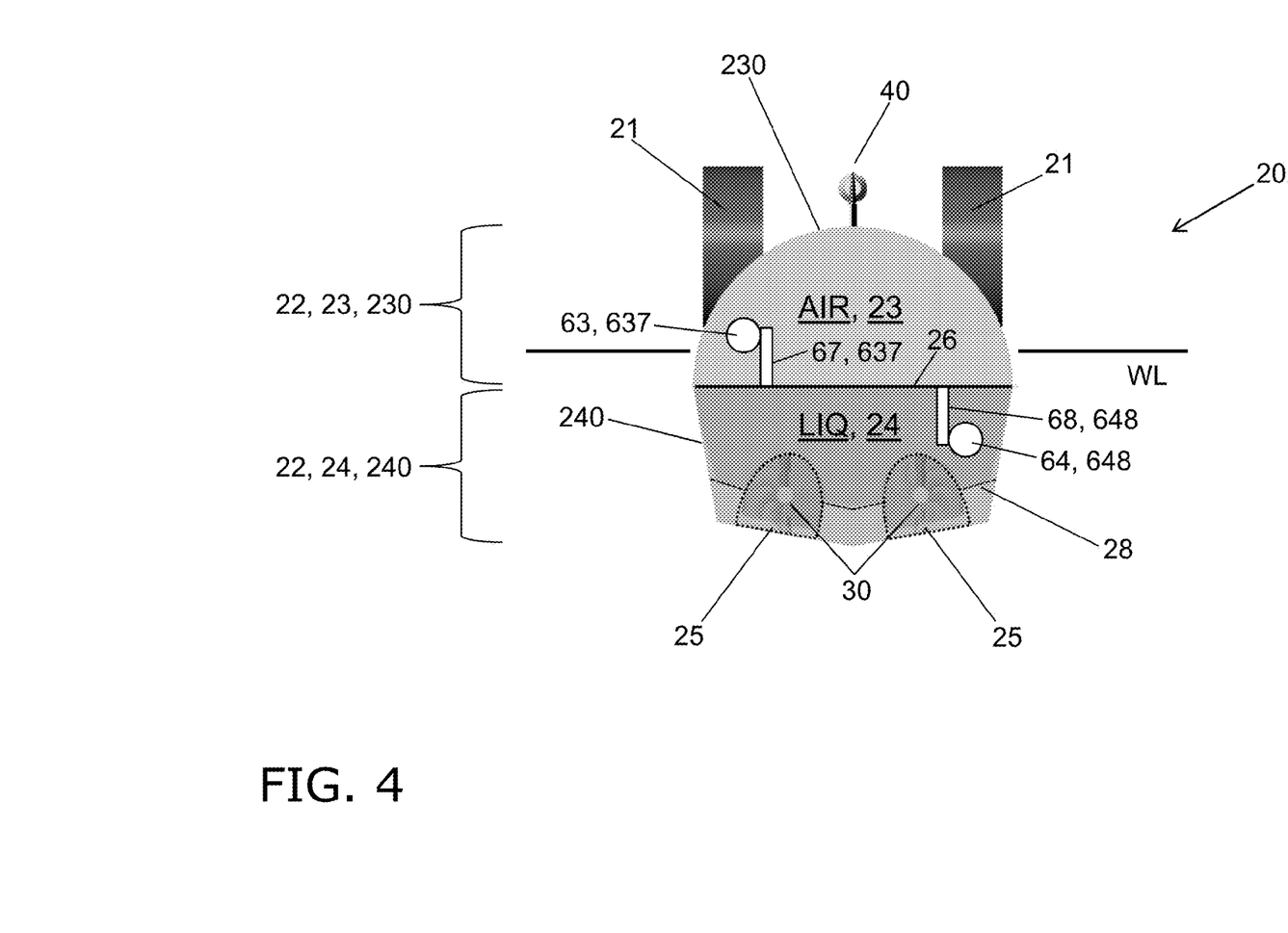
FIG. 4 is a front elevation view, partially in section, of the inventive vehicle configured wheels-up.
Figure 5:
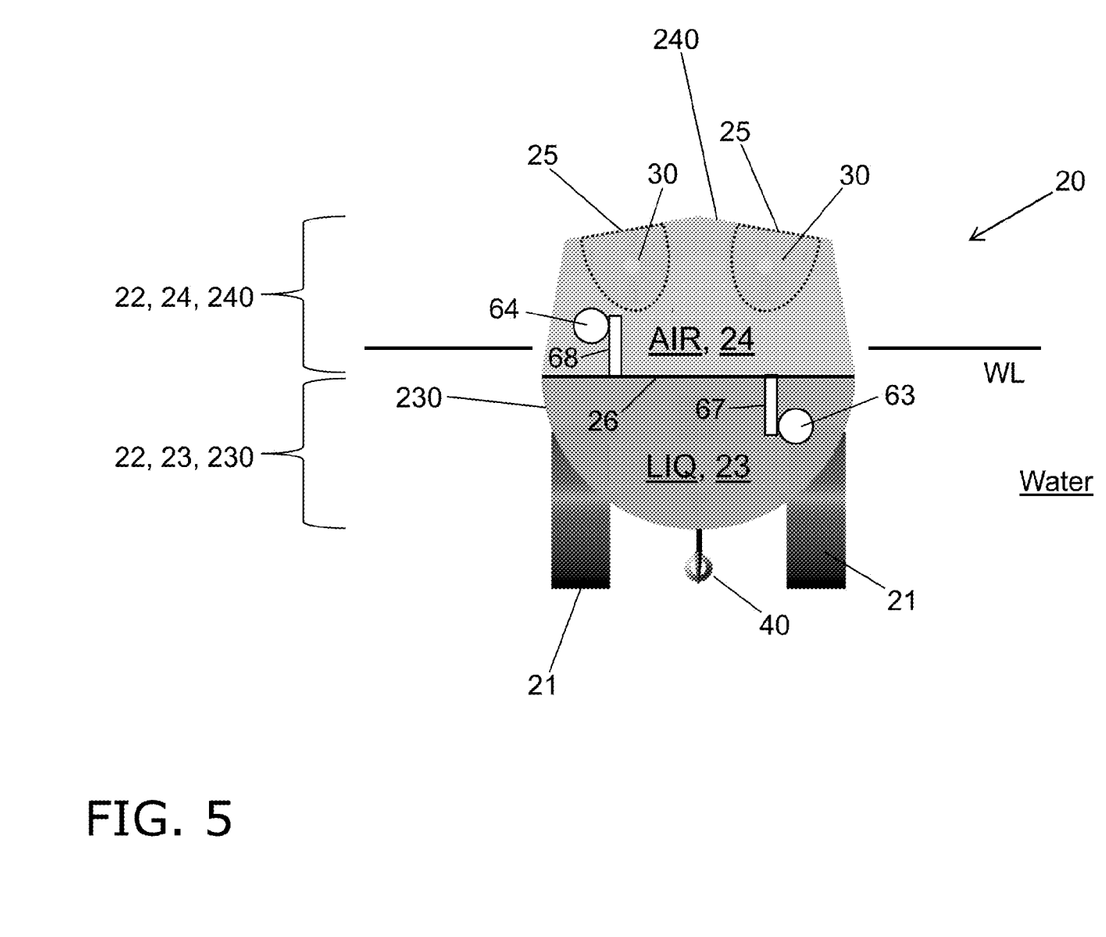
FIG. 5 is a front elevation view, partially in section, of the inventive vehicle configured wheels-down.
Figure 6:
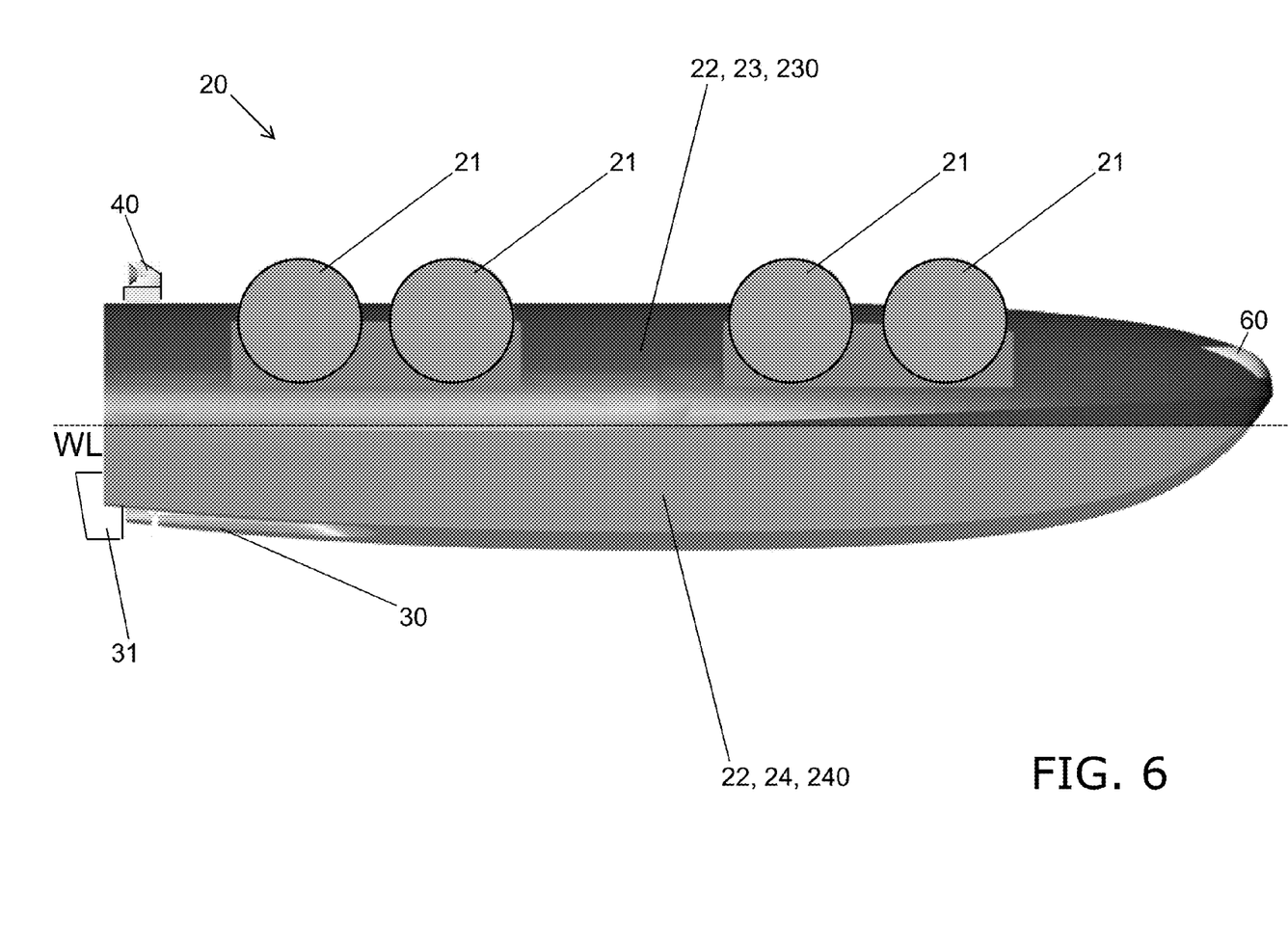
FIG. 6 is a side elevation view of the inventive vehicle configured wheels-up.
Figure 7:
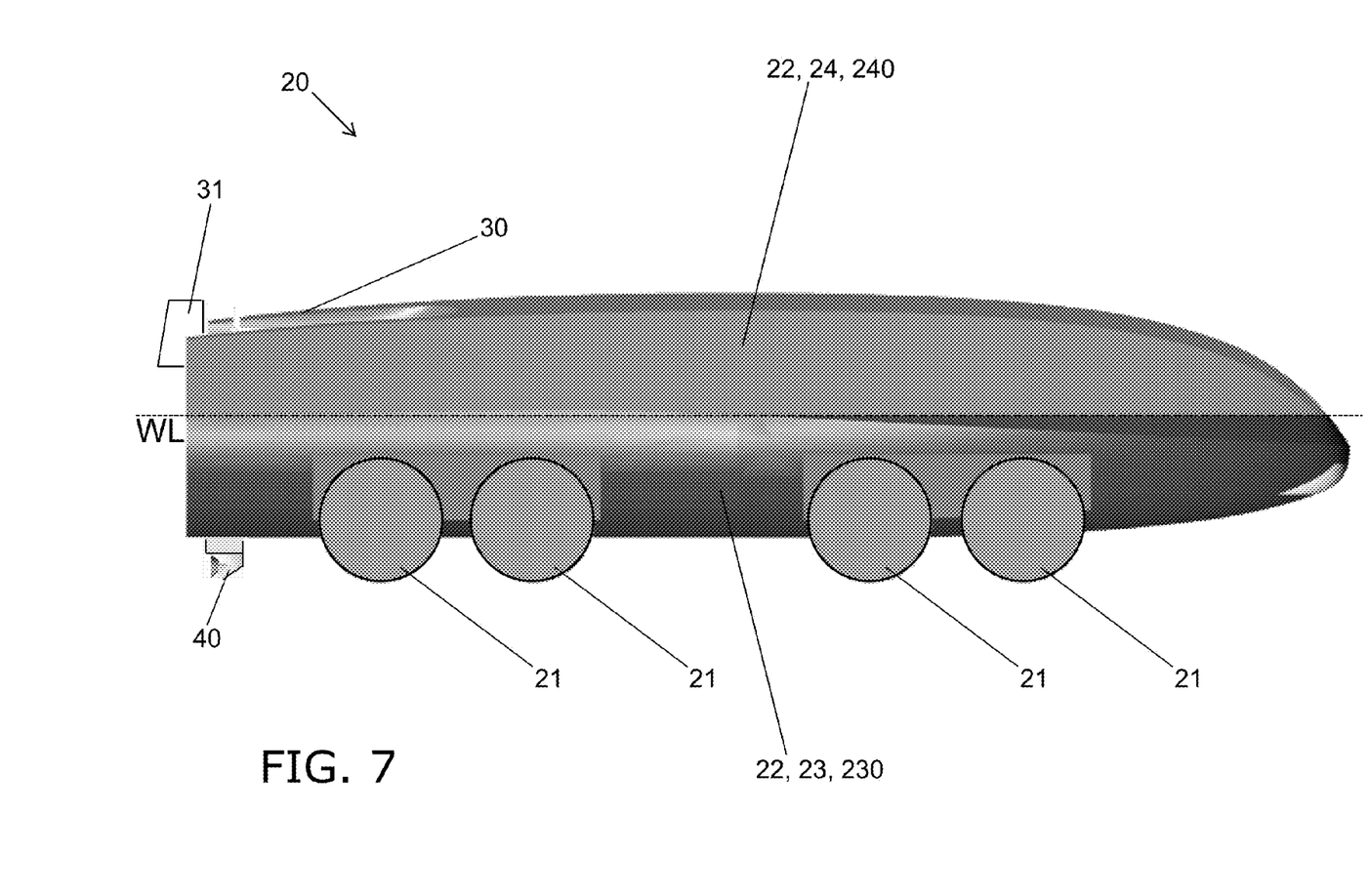
FIG. 7 is a side elevation view of the inventive vehicle configured wheels-down.

Referring now to the figures, the present invention's TTAFT vehicle 20 has eight wheels 21 and a hull 22. Wheels 21 are arranged in four coaxial port-and-starboard pairs. Especially as illustrated in FIG. 4 and FIG. 5, inside the hull 22 are a "wheel-side" compartment (e.g., tank) 23 and a "smooth-side" compartment (e.g., tank) 24. Horizontal solid (continuous) bifurcation wall 26 divides (e.g., approximately bisects) hull 22 into two longitudinal hull sections, viz., 230 and 240. Compartments 23 and 24 are separated by horizontal wall 26. Compartment 23 is enclosed by the wheel-side hull section 230. Compartment 24 is enclosed by the smooth-side hull section 240.

Either or both compartments may have a lining 28 to hold liquid cargo, or to serve as a water ballast tank or bladder for increasing stability of inventive vehicle 20, or for maintaining cargo liquid purity. Ballasting may be particularly useful in smooth-side compartment 24 while the inventive vehicle is in wheels-up mode; for instance, the amount of water ballast can be adjusted (e.g., the ballast tank/bladder filled or emptied) in inverse relation to the amount of liquid cargo contained in smooth-side compartment 24.

Particularly as illustrated in FIG. 1 through FIG. 5, inventive land-sea transport vehicle 20 is capable of navigating (floating) in water and riding (rolling) on land. The inventive vehicle 20 is invertible between a wheels-up position and a wheels-down position. More specifically, inventive vehicle 20 is capable of rotating about its geometric longitudinal axis a—i.e., capable of rolling—so as to flip over from the wheels-up position to the wheels-down position, or vice versa. Inventive vehicle 20 is caused to turn either "upside down" or "right-side up" by transfer of the liquid cargo LIQ from the upper compartment to the lower compartment. The terms "upside down" and "right-side up," as used herein in the context of inventive practice, refer to the "wheels-up" position and "wheels-down" position, respectively. An inventive vehicle that is upside-down has its wheels facing upward; an inventive vehicle that is right-side up has its wheels facing downward.

As shown in FIG. 4 and FIG. 5, horizontal bifurcation wall 26 tends to fall somewhat below the waterline WL, regardless of whether inventive vehicle 20 is floating in a wheels-up position (FIG. 4) or a wheels-down position (FIG. 5). When inventive vehicle 20 is operating in wheels-up mode, smooth-side compartment 24 is the lower compartment and is occupied by all of the cargo liquid LIQ, such as fuel oil or fresh/purified/drinkable water. When inventive vehicle 20 is operating in wheels-down mode, wheel-side compartment 24 is the lower compartment and is occupied by all of the cargo liquid LIQ.

Compartment 23 encompasses a pumping unit 637 including a pump 63 and a standpipe 67. Compartment 24 encompasses a pumping unit 648 including a pump 64 and a standpipe 68. Each compartment is fluid-tight; horizontal dividing wall 26, together with pumps 63 and 64 and standpipes 67 and 68, are configured to ensure that there is no unwanted infiltration or migration of any liquid LIQ between compartments 23 and 24. According to typical inventive practice, the two compartments (tanks) have at least approximately equal capacities.

Figure 1A:
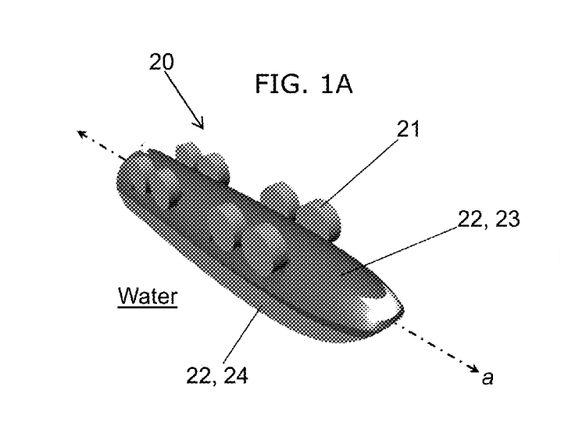

The smooth-side compartment 24 is the lower compartment when the vehicular configuration is wheels-up. The wheel-side compartment 23 is the upper compartment when the vehicular configuration is wheels-down. Having just been launched from a sea location, inventive vehicle 20 travels in water in its wheels-up configuration (FIG. 1A). While the vehicular position is wheels-up, the liquid LIQ is in smooth-side compartment 24, and wheel-side compartment is empty (more accurately, contains air AIR).

Figure 1B:
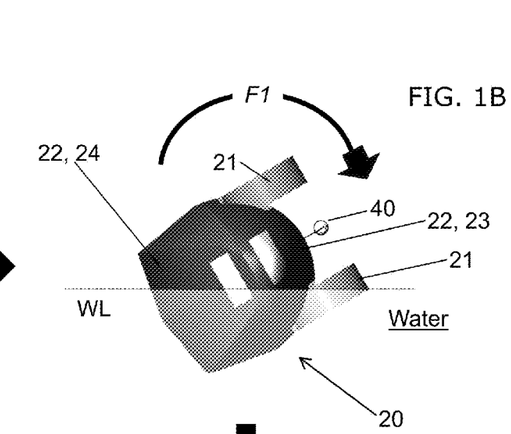

As shown in FIG. 1B, when inventive vehicle 20 reaches a particular location, typically near the shore destination, inventive vehicle 20 begins to transfer the cargo liquid LIQ generally upward, via pumping mechanism/unit 637 (which includes pump 63, and an inter-compartmental conduit such as a vertical tube or pipe 67), from smooth-side compartment 24 to wheel-side compartment 23. At a certain point, during the pumping of liquid LIQ from smooth-side compartment 24 to wheel-side compartment 23, a moment of force is reached whereby inventive vehicle 20 is caused to invert—i.e., turn over, roll over, or flip over—so that the vehicular configuration is wheels-down, as shown if FIG. 1C.

Figure 1C:
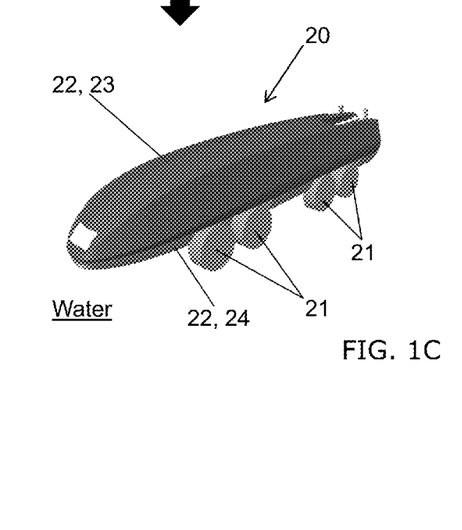
Figure 1D:
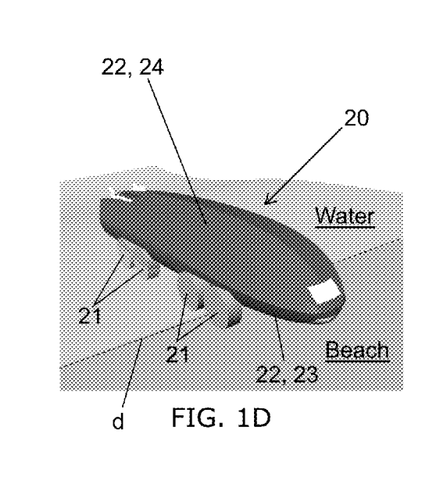
Figures 2, 2A, 2B, 2C, 2D:
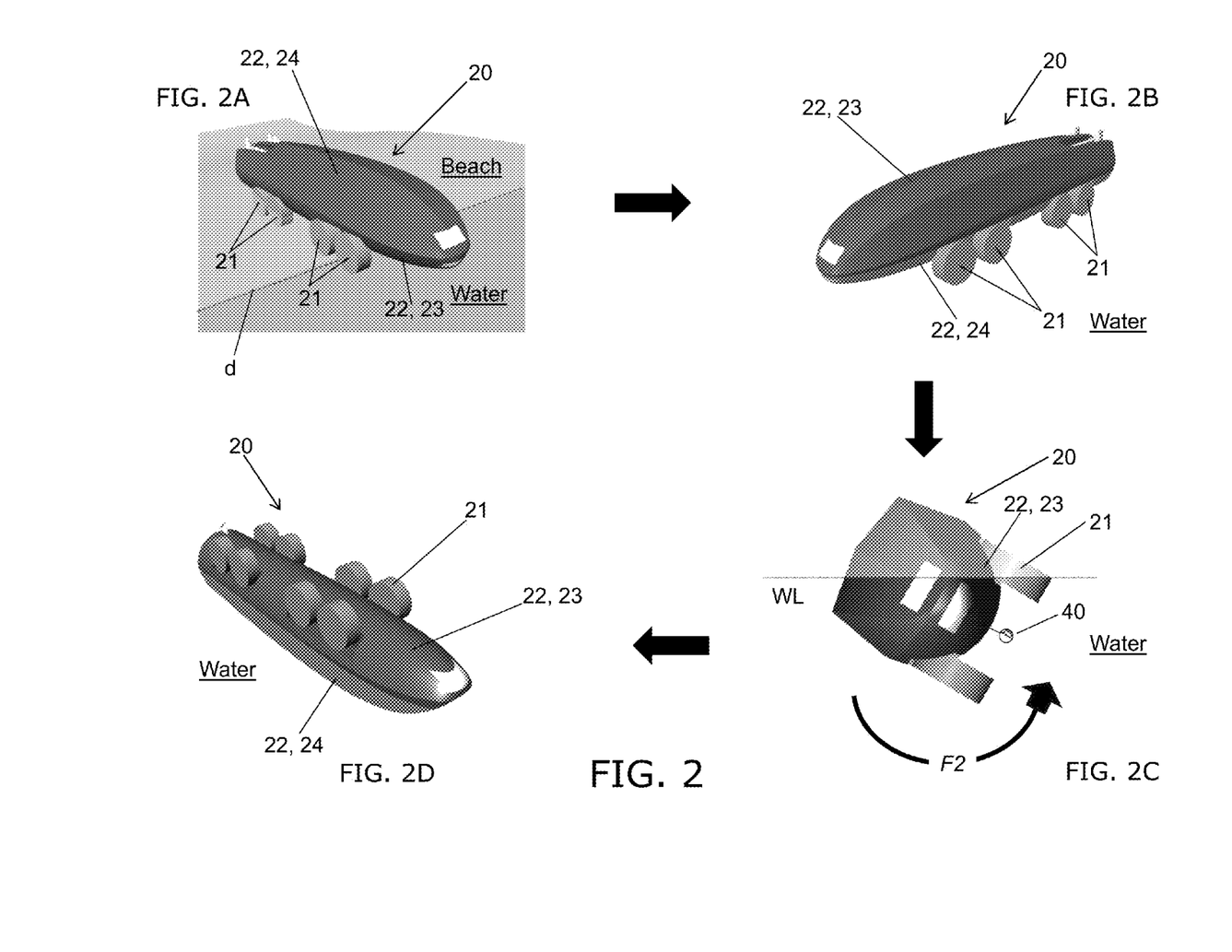
Figure 3:
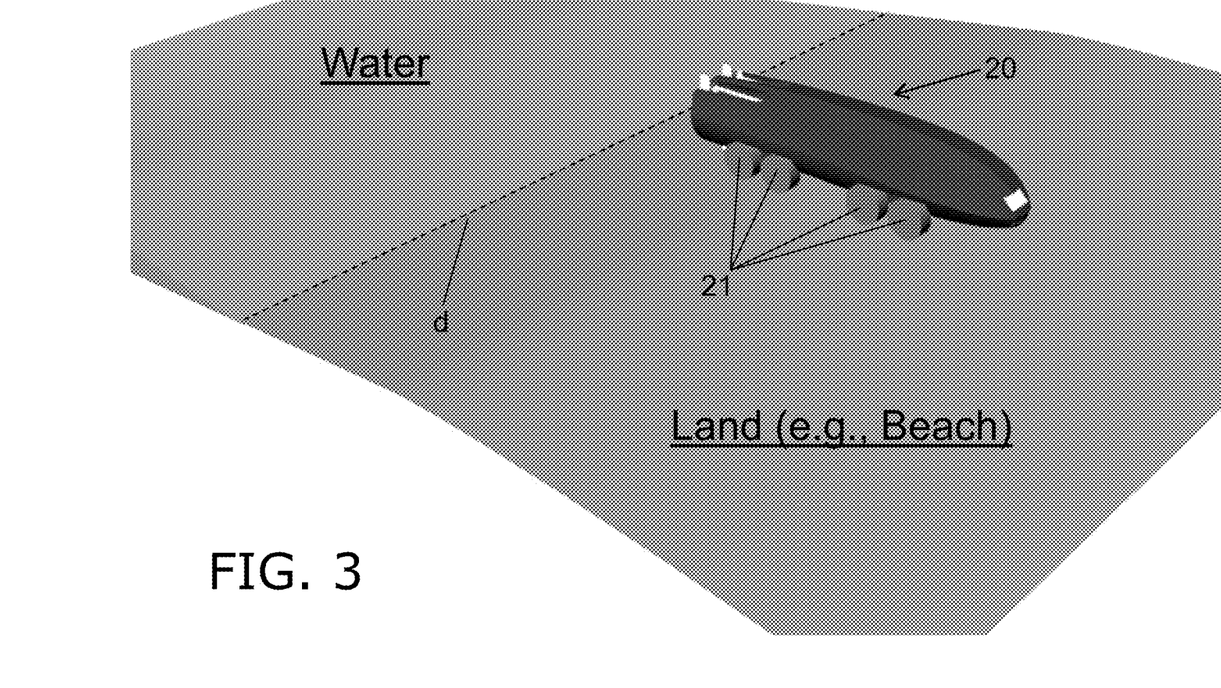
FIG. 3 is a perspective view, similar to the view of FIG. 1D, showing of the inventive vehicle configured wheels-down. The inventive vehicle is depicted riding on land (e.g., a beach area) after having exited water (e.g., a sea or other body of water).

Accordingly, inventive vehicle rotates 180° about its longitudinal axis a in wheels-up-to-wheels-down rotational (flip-over) direction F1 so as to transform from wheels-up buoyancy (FIG. 1A) to wheels-down buoyancy (FIG. 1C). While the vehicular position is wheels-down, the liquid LIQ is in wheel-side compartment 23, and smooth-side compartment 24 is empty (more accurately, contains air AIR). The inventive vehicle can now amphibiously transition from water to land (e.g., beach) by riding, via the wheels 21, from the shallow water onto the land area (FIG. 1D). As shown in FIG. 1D, FIG. 2A, and FIG. 3, demarcation line d is the dividing line between land (e.g., beach) and water.

The present invention's phases illustrated in FIG. 2 are essentially the reverse of those illustrated in FIG. 1. As shown in FIG. 2A, the inventive vehicle can amphibiously transition from land (e.g., beach) to water by riding, via the wheels 21, from the land area into the shallow water. The inventive vehicle 20 is shown in FIG. 2B in water in its wheels-down configuration.

As shown in FIG. 2C, when inventive vehicle 20 reaches a particular location (e.g., near the shore that it left), inventive vehicle 20 begins to transfer the cargo liquid LIQ generally upward, via pumping mechanism/unit 648 (which includes pump 64, and an inter-compartmental conduit such as a vertical tube or pipe 68), from wheel-side compartment 23 to smooth-side compartment 24. At a certain point, during the pumping of liquid LIQ from wheel-side compartment 23 to smooth-side compartment 24, a moment of force is reached whereby inventive vehicle 20 is caused to invert—i.e., turn over, roll over, or flip over—so that the vehicular configuration is wheels-up, as shown in FIG. 2D.

Accordingly, inventive vehicle rotates 180° about its longitudinal axis a in wheels-down-to-wheels-up rotational (flip-over) direction F2 so as to transform from wheels-down buoyancy (FIG. 2B) to wheels-up buoyancy (FIG. 2D). While the vehicular position is wheels-up, the liquid LIQ is in smooth-side compartment 24 and wheel-side compartment 23 is empty (more accurately, contains air AIR).

Figure 10:
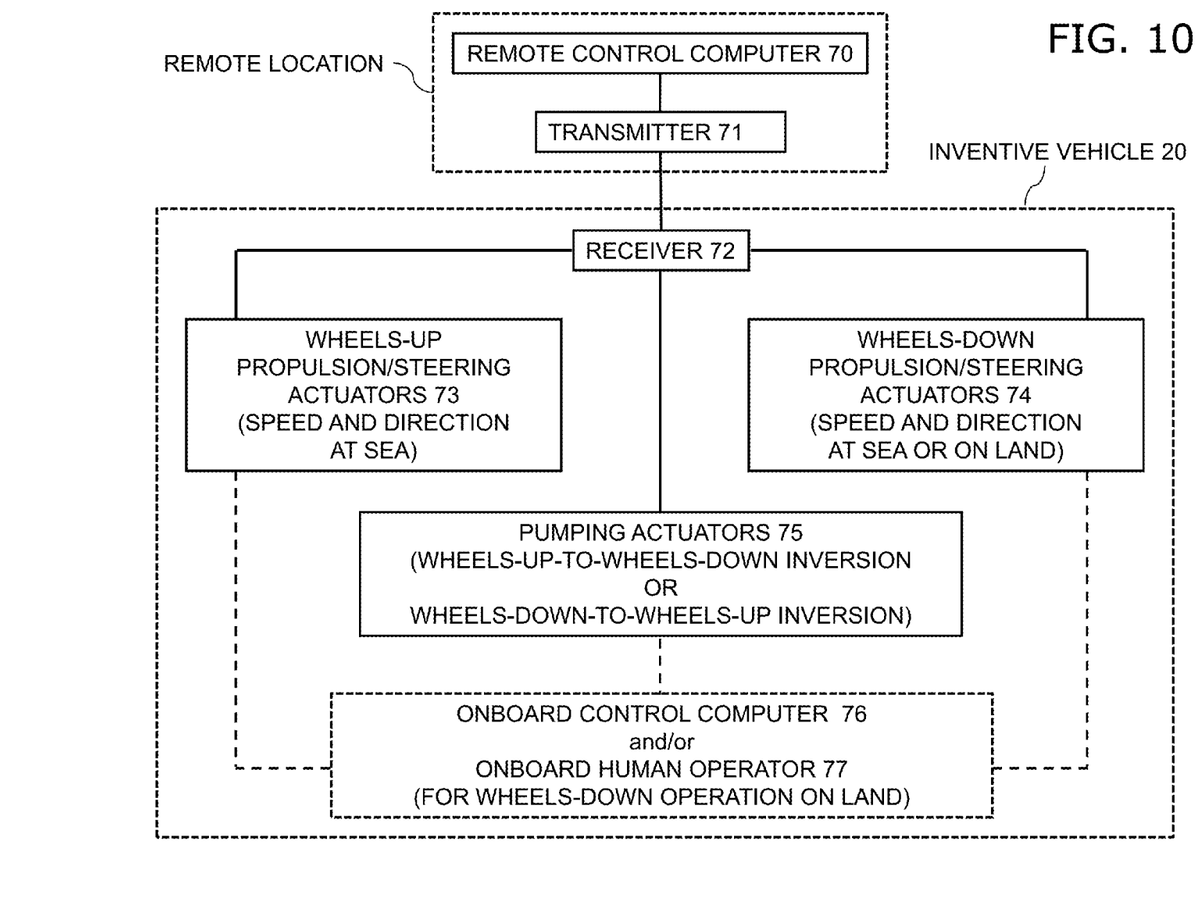
FIG. 10 is a box diagram representative of some embodiments of vehicular control in accordance with the present invention.

Still with reference to FIGS. 1-9 and particularly with reference to FIG. 10, radio frequency control computer 70 is remotely situated and communicates (wirelessly or wiredly/connectively) with RF transmitter 71 (e.g., including a transmitting antenna), which accordingly sends radio signals through the atmosphere to RF receiver 72, which is situated onboard the inventive vehicle 20. Receiver 72 (e.g., including a receiving antenna) accordingly activates actuators (such as including motors) situated inside the inventive vehicle 20. There is at least one actuation device 73, at least one actuation device 74, and at least one actuation device 75. Some inventive embodiments may provide for two-way communication between remote controller and inventive vehicle, such as providing for remote controller's transceiver 71 and inventive vehicle's transceiver 72. The skilled artisan who reads the instant disclosure will appreciate that power sources, not shown in the figures, are needed for the electronic components of an inventive vehicular system. The Global Positioning System (GPS) can be implemented for a variety of inventive vehicular control strategies, whether control is remotely or locally based.

The wheels-up propulsion-and-steering actuators 73 govern the speed and direction of water travel while the inventive vehicle 20 is in the wheels-up position (e.g., by operating marine propellers 30 and/or rudder 31). The wheels-down propulsion-and-steering actuators 74 govern the speed and direction of: (i) water travel while the inventive vehicle 20 is in the wheels-down position (e.g., by operating water propulsor 40); or, (ii) land travel while the inventive vehicle 20 is in the wheels-down position (e.g., by turning and steering wheels 21).

Particularly with reference to FIG. 4, while the inventive vehicle 20 is in water in the wheels-up position, the smooth-side compartment pump 64 is the lower compartment, and the wheel-side compartment pump 63 is the upper compartment. To effect inversion in water from the wheels-up position to the wheels-down position, the pumping actuators 75 direct the smooth-side compartment pump 63 to empty the liquid LIQ contents into the wheel-side compartment 23, thereby flipping-over the inventive vehicle 20 from the wheels-up position to the wheels-down position. The liquid LIQ transfers gradually from the lower compartment to the upper compartment, but the inventive vehicle does not flip over entirely (i.e., rotate one-hundred eighty degrees) from the wheels-up position to the wheels-down position until the "overturning" moment of force (e.g., in foot-pounds) is reached.

Similarly, particularly referring to FIG. 5, while the inventive vehicle 20 is in water in the wheels-down position, the wheels-side compartment pump 64 is the lower compartment, and the smooth-side compartment pump 63 is the upper compartment. To effect inversion in water from the wheels-down position to the wheels-up position, the pumping actuators 75 direct the wheel-side compartment pump 64 to empty the liquid LIQ contents into the smooth-side compartment 23, thereby flipping-over the inventive vehicle 20 from the wheels-down position to the wheels-up position. Here again, the liquid LIQ transfers gradually from the lower compartment to the upper compartment, but the inventive vehicle does not flip over entirely (i.e., rotate one-hundred eighty degrees) from the wheels-down position to the wheels-up position until the overturning moment of force (e.g., in foot-pounds) is reached. The threshold moment for effecting flip-over from wheels-up position to wheels-down position may differ from the threshold moment for effecting flip-over from wheels-down position to wheels-up position.

Liquids tend to slosh about in response to changes in attitude of a marine vessel. The term "free surface effect" refers to this mechanism, which can cause a vessel to become unstable and capsize. It is generally preferred inventive practice to minimize or eliminate free surface effects by completely filling the inventive vehicle's tank that is, or is to be, the bottom tank. By way of example, when vehicle 20 is wheels-up as shown in FIG. 4, the lower compartment (smooth-side compartment 24) should be filled all the way up to the "tank top"—i.e., all the way up to the horizontal dividing wall 26—and into standpipe 68. Similarly, when vehicle 20 is wheels-down as shown in FIG. 5, the lower compartment (wheel-side compartment 23) should be filled all the way up to the "tank top"—i.e., all the way up to the horizontal dividing wall 26—and into standpipe 67. At least substantially filling the bottom tank promotes stability not only by reducing free surface effects, but also by providing liquid of sufficient weight in the lower tank to counteract inherent instabilities in many inventive vehicle hull designs. A typical inventive vehicle will tend to be too unstable when carrying a partially filled tank while waterborne.

The present invention is typically embodied as an amphibious wheeled vehicle that can function as a marine vessel when in the water, and as a wheeled motor vehicle when on land. The term "truck" is used herein to refer to inventive vehicle 20, as the present invention obviates the need for implementing a marine vessel to transport one or more trucks in order to transport payloads over land. In other words, inventive vehicle 20 is its own truck, i.e., representing both a cargo vessel (for use in water) and a cargo truck (for use on land). Expressed another way, inventive vehicle 20 is both a "water truck" and a "land truck." The present invention's vehicle is more descriptively referred to herein as a "Transformable Teleoperated Amphibious Fuel Truck" (acronymously, "TTAFT").

Inventive vehicle 20 is capable of turning upside-down and right-side up—that is, of turning about its geometric axis a from wheels-up (upside down) position to wheels-down (right-side up) position and from wheels-down (right-side up) position to wheels-up (upside down) position. While inventive vehicle 20 is in the wheels-up position, inventive vehicle 20 is in water whereby its smooth-side hull section 230 is at least substantially submerged and the wheel-side hull section 230 is at least substantially out of (above) the water. When traveling in wheels-up orientation, inventive vehicle 20 entirely avoids drag associated with wheels 21, and floats primarily implementing smooth-side hull section 230, which is shaped for efficient hydrodynamics.

Inventive hull 22 design can be optimized for providing for propulsion and maneuverability. For instance, two marine propellers 30 and two marine rudders 31 can be provided for wheels-up operation, and a marine jet (e.g., water-jet) propulsion unit 40 can be provided for wheels-down operation. The skilled artisan who reads the instant disclosure will appreciate that vehicle 20 can be embodied with a variety of propulsors (propellers, waterjets, airjets, militarized submersible outboard motor, etc.), and hence propulsion and direction can be accomplished in various ways in both wheels-up and wheels-down operation of vehicle 20. The wheels-down propulsion device 40 can be made to be pivotable so as to both propel and direct inventive vehicle 20, and/or can be made to be retractable inside smooth-side hull section 240 so as to avoid ground contact when traveling on land. Smooth-side hull section 240 can be designed as a "tunnel hull," for example having two tunnels 25 that accommodate propellers 30 and rudders 31.

Inventive vehicle 20 can be remotely operated at sea and on land. Practically any body of water (ocean, sea, large rivers, lakes, etc.) can be navigated and traversed by inventive vehicle 20. Human factors are taken out of the equation, so to speak, when inventive vehicle 20 is waterborne. Therefore, risks to humans of injuries and casualties are avoided, and greater Sea State capabilities and more dangerous circumstances are possible than if there were a human presence onboard. Nevertheless, a remote-control vehicular system in accordance with the present invention can incorporate manned operation of an inventive vehicle 20 while it is in wheels-down mode on land. Manned land operation by at least one human operator 77, for instance a driver and a navigator situated in cabin 60, may be propitious in inventive practice when crowded or congested land areas must be traversed to reach a destination.

According to typical inventive practice, the basic operative principle is to accomplish fuel/water delivery by remotely controlling inventive vehicle 20 through water and over land. Inventive vehicle 20 may be fully loaded as it is deployed: far offshore, via crane, from a sea base container ship or a well deck ship; or, if Sea State 1, via ramp from a joint high-speed vessel (JHSV) or mobile landing platform (MLP) via ramp.

A remote control operator is assigned to inventive vehicle 20, which is launched as a remotely piloted vehicle (RPV). While in water, inventive vehicle 20 typically is operated so as to commence its journey in the upside down (wheels up) position. If the inventive vehicle is initially right-side up (wheels down) on upon situation in water, the inventive vehicle is caused to turn upside down (wheels up) via internal fuel/water transfer. The internal liquid transfer is to be remotely controlled. With its wheels up, the inventive vehicle heads to shore under remote control. Near (approaching) the shoreline, inventive vehicle 20 turns right-side up, and then the deployable outboard motor 40 powers inventive vehicle 20 to the beach, whereupon inventive vehicle 20 drives ashore.

On land, inventive vehicle 20 is remotely driven to the area or areas of need. Alternatively, a human driver 77, situated in cabin 60 of vehicle 20, can operate inventive vehicle 20 on land. Additionally or alternatively, an onboard computer 76, situated in inventive vehicle 20, can afford autonomous control of inventive vehicle 20. Human land operation of inventive vehicle 20, which on land is in wheels-down condition, may be especially propitious in congested land areas. At the destination area(s), inventive vehicle 20 refuels land vehicles or supplies water.

Once its tasks are completed, inventive vehicle 20 essentially reverses its phases of operation and returns, in RPV fashion, to the ship, boat, or base from whence it came.

Figure 11:
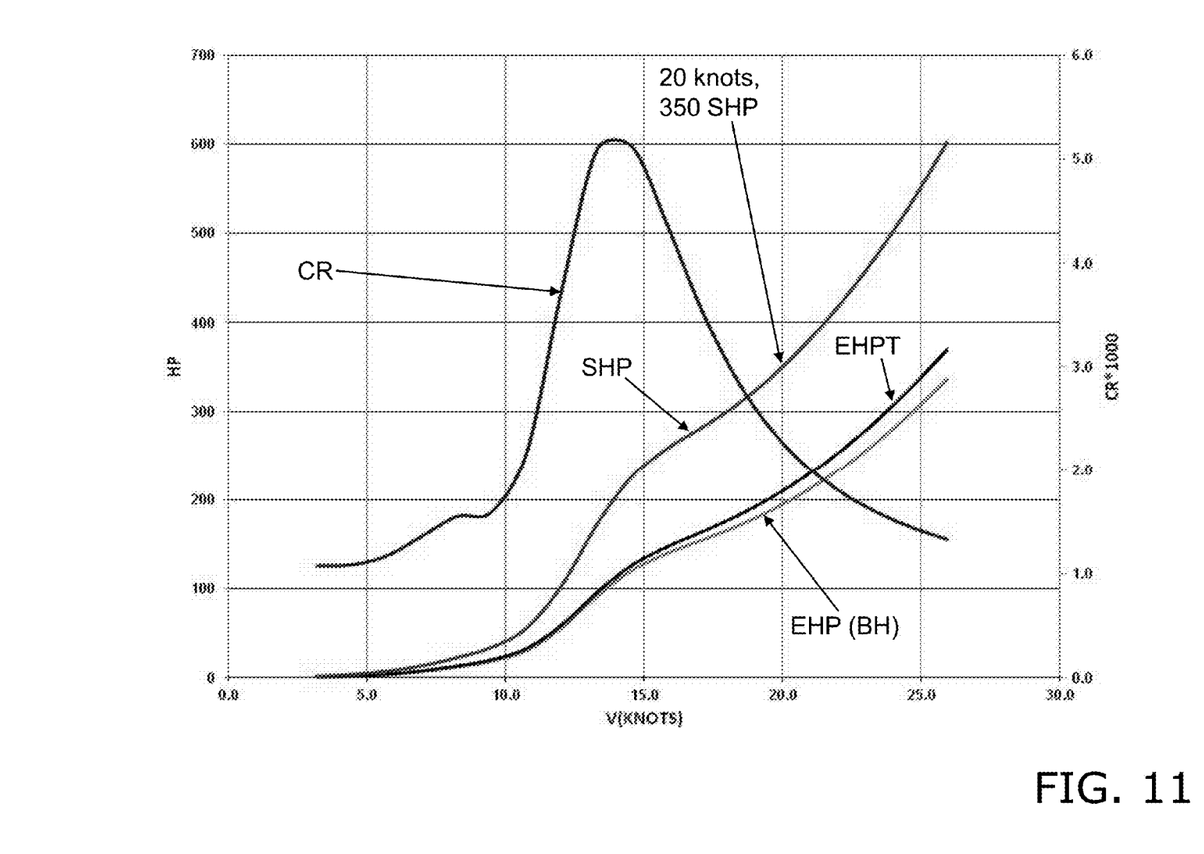
FIG. 11 is a graph representing a regression analysis estimate of powering in water of a 30 LT (ton) embodiment of a vehicle in accordance with the present invention.

The inventive vehicle 20 shown in FIG. 1 through FIG. 9 can be considered to be conceptually representative of a variety of inventive embodiments. For instance, inventive vehicle 20 can weigh about 30 LT, carry a fuel/water payload weighing about 20 LT, and navigate up to about a 20-to-25 knot water speed. FIG. 11 graphically represents a regression analysis estimate of powering in water by a 30 LT inventive vehicle 20. Many other vehicle sizes are possible, such as an inventive vehicle 20 weighing about 70 LT and carrying liquid LIQ weighing about 40 LT.

Figure 8:
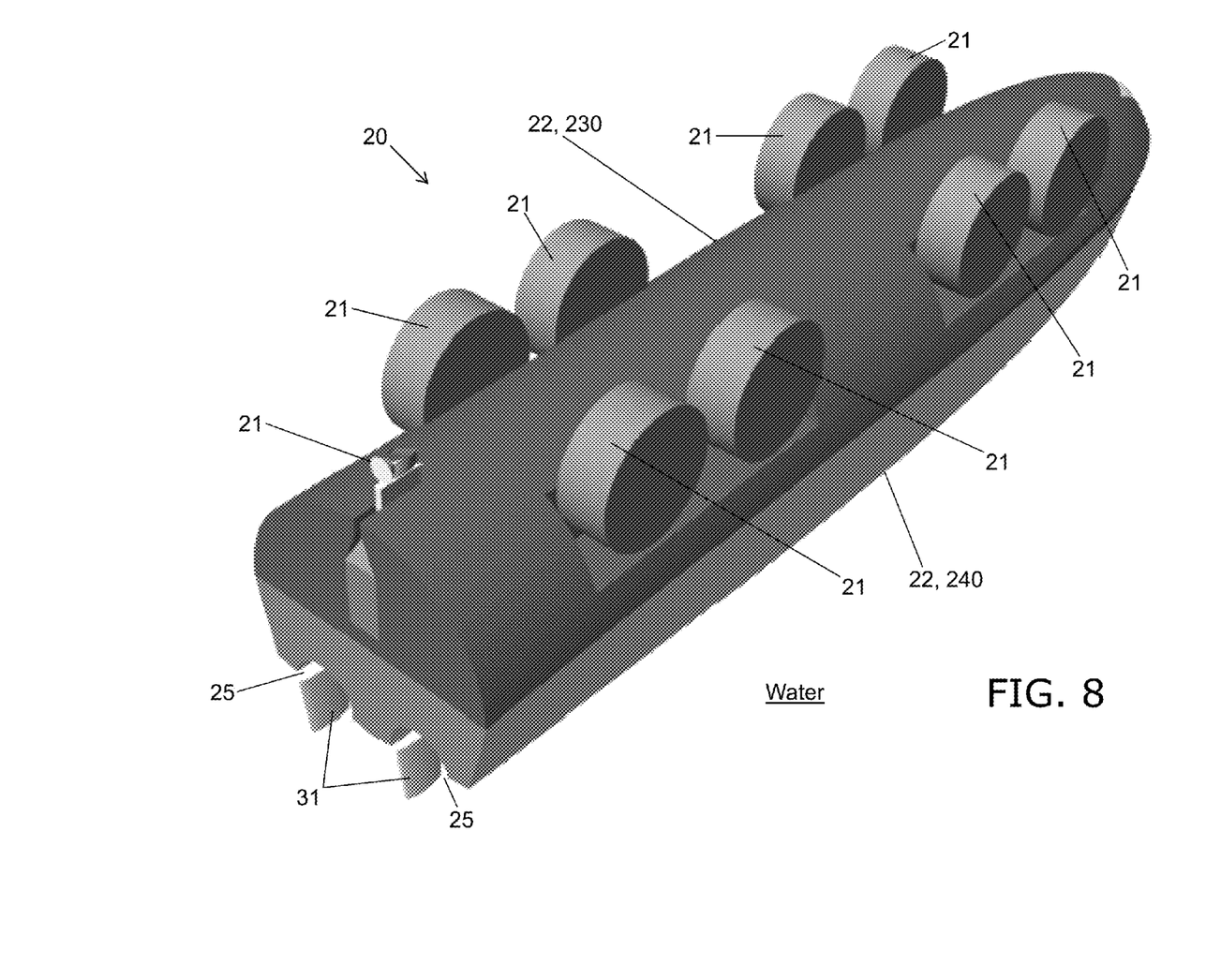
FIG. 8 is top perspective view of the inventive vehicle configured wheels-up.
Figure 9:
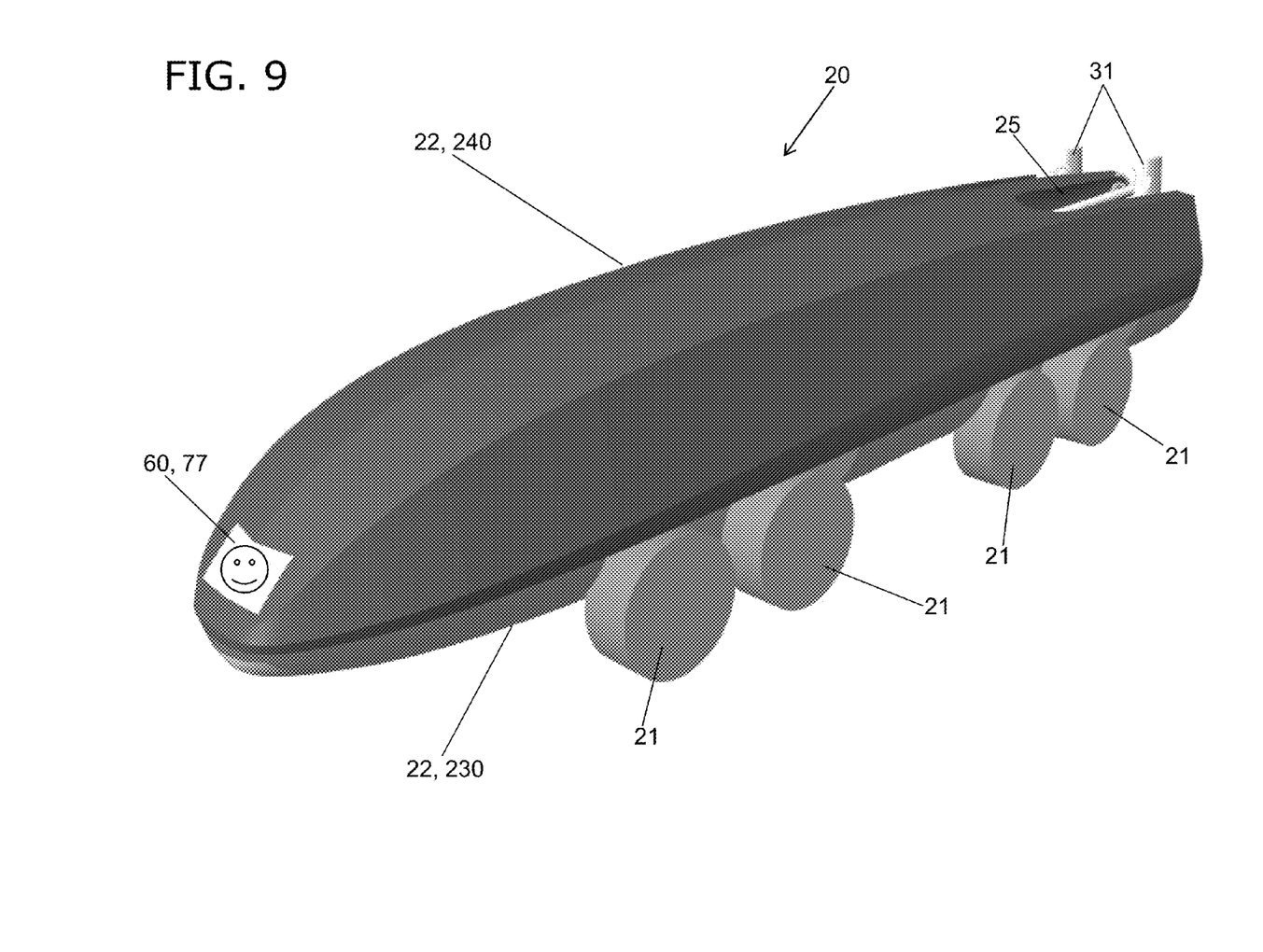
FIG. 9 is a top perspective view of the inventive vehicle configured wheels-down.

A set of eight wheels 21, in four coaxial pairs, is shown in FIG. 1 through FIG. 9, but practically any plural number of wheels (usually at least three) in a variety of arrangements can be implemented in inventive practice. Furthermore, some inventive embodiments provide for steerable wheels 21. Multifarious displacement hull designs can be inventively implemented, such as the "tunneled" smooth-side hull section 24, which has two bottom hull tunnels 25 as shown in FIG. 4, FIG. 5, and FIG. 8. The present invention can be practiced in combination with principles of another invention by present inventor Gabor Karafiath, disclosed in copending United States nonprovisional patent application Ser. No. 12/228,321, incorporated herein by reference, filing date 5 Aug. 2008, entitled "Connectorless Sea Train."

The utility of an inventive vehicle 20 need not be limited to sea-to-land transport. For instance, inventive practice is also possible for/as sea-to-sea transport (e.g., to refuel ships, boats, or LCACs at sea), land-to-land transport, at-sea launch and recovery of RPVs, commercial motor homes, and all-terrain trucks. According to typical inventive practice, inventive vehicle 20 will generally travel considerably faster in wheels-up mode than in wheels-down mode. The higher vehicular speeds can be beneficial for transporting water, as this can help maintain water quality and freshness. It is important to note that an inventive vehicle 20 is significantly distinguishable from a self-righting lifeboat (rescue boat) such as used by the USCG, which can only propel itself when right-side up (i.e., in its normal up-down orientation). In contrast, a typical inventive vehicle 20 affords continuous engine operation (including propulsion and steering) while both right-side up and upside down. Both up-down orientations are normal for a typical inventive vehicle.

According to typical inventive practice, the inventive vehicle 20's length-to-beam ratio is within conventional standards. For instance, the inventive vehicle 20 design depicted in FIG. 1 through FIG. 9 has a length-to-beam ratio (L/B) of about five, which is well within traditional practice for planing hulls. However, according to typical inventive practice, the inventive vehicle's beam-to-draft ratio (B/D) is not within conventional standards. For instance, the inventive vehicle 20 design depicted in FIG. 1 through FIG. 9 has a beam-to-draft ratio (B/D) of about 1.8, which is well below traditional practice for planing hulls, and is so deep that commercial ships with that B/D would capsize. Notwithstanding its low B/D, the inventive vehicle as typically embodied can provide a very low center of gravity (CG) by storing liquid cargo at its bottom. Feasibility of the present invention is heightened by its feature of storing liquid whereby it gravitates to the bottom of the inventive craft.

Inventive practice will normally require a significant amount of payload liquid for stability of the inventive vehicle. In the absence of cargo liquid (such as fuel oil or fresh water), which in sufficient amounts is heavy and which is easy to shift to the very lowest points of a cavity, a low B/D such as 1.8 would promote instability of many designs of inventive vehicles. This inventive vehicle is characterized by a "nearly unstable" hull form, and is unstable for conventional cargoes and empty ballast conditions. This nearly unstable inventive hull form has an unusually low B/D ratio, on the order of 1.8, and is outside the range of normal hull forms. The inventive hull operates in the supercritical range, way above the 11-to-13 knot hump speed of normal hull forms. For this reason, an inventive vehicle's propulsion devices (e.g., propellers) need to be designed for both hump speed and design speed. With regard to these and other aspects of the present invention, a practitioner of the present invention may benefit from engineering design strategies such as involving analytically aided hull form designs and model tests of waterborne powering performance.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A watercraft comprising upper and lower compartments and upper and lower pumps for transferring liquid between said compartments so that the watercraft is right-side up when the liquid is at least predominately in the lower compartment and is upside down when the water is at least predominately in the upper compartment, wherein:
    the watercraft is configured to perform water transportation while the watercraft is upside down;
    the watercraft is configured to perform either water transportation or land transportation while the watercraft is right-side up;
    the watercraft further comprises a set of wheels;
    said wheels are configured to be out of the water during performance of water transportation while the watercraft is upside down;
    said wheels are configured to be in the water during performance of water transportation while the watercraft is right-side up;
    said wheels are configured to be rollable and on land during performance of land transportation while the watercraft is right-side up.

2. The watercraft of claim 1 wherein:
    the watercraft is configured to transition from right-side-up to upside-down when the weight of the liquid is sufficiently shifted from the lower compartment to the upper compartment that an overturning moment is reached for effecting the transitioning from right-side-up to upside-down;
    the watercraft is configured to transition from upside down to right-side up when the weight of the liquid is sufficiently shifted from the upper compartment to the lower compartment that an overturning moment is reached for effecting the transitioning from upside down to right-side up.

3. The watercraft of claim 1 wherein said wheels are configured to facilitate transitioning of the watercraft from water transportation to land transportation while the watercraft is right-side up.

4. The watercraft of claim 1 further comprising:
    at least one device configured to propel and steer the watercraft during performance of water transportation when the watercraft is upside down;
    at least one device configured to propel and steer the watercraft during performance of water transportation when the watercraft is right-side up.

5. The watercraft of claim 4 further comprising at least one device configured to rotate and steer said wheels during performance of land transportation.

6. The watercraft of claim 5 further comprising a radio frequency receiver configured to receive remote signals that control:

said at least one device configured to propel and steer the watercraft during performance of water transportation when the watercraft is right-side-up;

said at least one device configured to propel and steer the watercraft during performance of water transportation when the watercraft is upside-down;

said at least one device configured to rotate and steer said wheels during performance of land transportation.

7. A marine vessel comprising:

a hull characterized by approximately a geometric longitudinal axis and divided into two hull sections by approximately a geometric horizontal plane, said hull sections being a first hull section and a second hull section, said hull being capable of turning about said longitudinal axis so as to invert either from a first waterborne condition to a second waterborne condition or from said second waterborne condition to said first waterborne condition, wherein according to said first waterborne condition said first hull section is at least substantially above water and said second hull section is at least substantially below water, and wherein according to said second waterborne condition said second hull section is at least substantially above water and said first hull section is at least substantially below water;

two chambers, said chambers being a first chamber and a second chamber, said first chamber encompassed by said first hull section, said second chamber encompassed by said second hull section;

two pumping mechanisms, said two pumping mechanisms being a first pumping mechanism and a second pumping mechanism, said first pumping mechanism being configured to pump liquid from said first chamber to said second chamber, said second pumping mechanism being configured to pump liquid from said second chamber to said first chamber, said first waterborne condition resulting from pumping of liquid via said first pumping mechanism from said first chamber to said second chamber, said second waterborne condition resulting from pumping of liquid via said second pumping mechanism from said second chamber to said first chamber;

at least three wheels associated with said first hull section, said wheels enabling said hull to ride upon a solid surface during and following exit of said hull in said first waterborne condition from a body of water.

8. The marine vessel of claim 7, wherein:

said hull is configured to invert from said second waterborne condition to said first waterborne condition when the proportion of liquid between said first chamber and said second chamber is sufficiently shifted in favor of said second chamber that a moment of force associated with the mass of the liquid causes said hull to turn over from said second waterborne condition to said first waterborne condition;

said hull is configured to invert from said first waterborne condition to said second waterborne condition when the proportion of liquid between said first chamber and said second chamber is sufficiently shifted in favor of said first chamber that a moment of force associated with the liquid causes said hull to turn over from said first waterborne condition to said second waterborne condition.

9. The marine vessel of claim 8, further comprising a teleoperational system configured to:

remotely control speed and direction of said hull, said teleoperational system including a radio frequency receiver associated with said hull and a radio frequency transmitter distanced from said hull;

cause said hull to invert from said second waterborne condition to said first waterborne condition;

cause said hull to invert from said first waterborne condition to said second waterborne condition.

10. The marine vessel of claim 7, further comprising:

at least one first-condition device, configured to perform at least one of propelling and steering of said hull, while said hull is in said first waterborne condition;

at least one second-condition device, configured to perform at least one of propelling and steering of said hull, while said hull is in said second waterborne condition;

said at least one first-condition device includes at least one device selected from the group consisting of waterjet, airjet, propeller, and rudder;

said at least one first-condition device includes at least one device selected from the group consisting of waterjet, airjet, propeller, and rudder.

11. A marine vessel comprising:

a hull characterized by approximately a geometric longitudinal axis and divided into two hull sections by approximately a geometric horizontal plane, said hull sections being a first hull section and a second hull section, said hull being capable of turning about said longitudinal axis so as to invert either from a first waterborne condition to a second waterborne condition or from said second waterborne condition to said first waterborne condition, wherein according to said first waterborne condition said first hull section is at least substantially above water and said second hull section is at least substantially below water, and wherein according to said second waterborne condition said second hull section is at least substantially above water and said first hull section is at least substantially below water;

two chambers, said chambers being a first chamber and a second chamber, said first chamber encompassed by said first hull section, said second chamber encompassed by said second hull section;

two pumping mechanisms, said two pumping mechanisms being a first pumping mechanism and a second pumping mechanism, said first pumping mechanism being configured to pump liquid from said first chamber to said second chamber, said second pumping mechanism being configured to pump liquid from said second chamber to said first chamber, said first waterborne condition resulting from pumping of liquid via said first pumping mechanism from said first chamber to said second chamber, said second waterborne condition resulting from pumping of liquid via said second pumping mechanism from said second chamber to said first chamber;

a teleoperational system configured to remotely control speed and direction of said hull, said teleoperational system including a radio frequency receiver associated with said hull and a radio frequency transmitter distanced from said hull;

at least three wheels associated with said first hull section, wherein said wheels are configured to:

move said hull from said second waterborne condition to a land-borne condition;

move said hull while said hull is in said land-borne condition.

12. A marine vessel comprising:

a hull characterized by approximately a geometric longitudinal axis and divided into two hull sections by approximately a geometric horizontal plane, said hull sections being a first hull section and a second hull section, said hull being capable of turning about said longitudinal axis so as to invert either from a first waterborne condition to a second waterborne condition or from said second waterborne condition to said first waterborne condition, wherein according to said first waterborne condition said first hull section is at least substantially above water and said second hull section is at least substantially below water, and wherein according to said second waterborne condition said second hull section is at least substantially above water and said first hull section is at least substantially below water;

two chambers, said chambers being a first chamber and a second chamber, said first chamber encompassed by said first hull section, said second chamber encompassed by said second hull section;

two pumping mechanisms, said two pumping mechanisms being a first pumping mechanism and a second pumping mechanism, said first pumping mechanism being configured to pump liquid from said first chamber to said second chamber, said second pumping mechanism being configured to pump liquid from said second chamber to said first chamber, said first waterborne condition resulting from pumping of liquid via said first pumping mechanism from said first chamber to said second chamber, said second waterborne condition resulting from pumping of liquid via said second pumping mechanism from said second chamber to said first chamber;

a teleoperational system configured to: remotely control speed and direction of said hull, said teleoperational system including a radio frequency receiver associated with said hull and a radio frequency transmitter distanced from said hull; cause said hull to invert from said second waterborne condition to said first waterborne condition; cause said hull to invert from said first waterborne condition to said second waterborne condition;

at least three wheels associated with said first hull section, wherein said wheels are configured to: move said hull from said second waterborne condition to a land-borne condition; move said hull while said hull is in said land-borne condition.

\* \* \* \* \*